April 28, 1959   L. GIL DE GIBAJA HERRERO   2,884,001
LIQUID LEVEL CONTROL SYSTEM
Filed Oct. 31, 1957
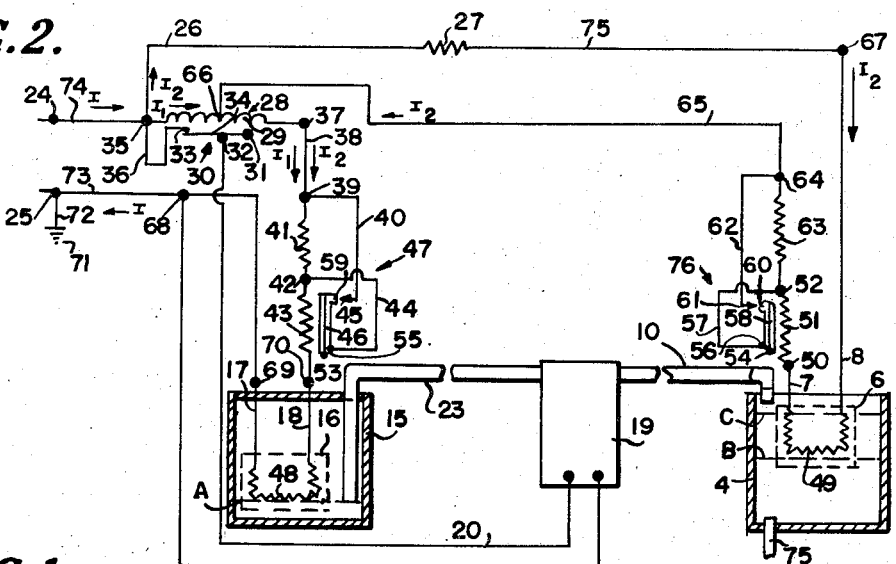
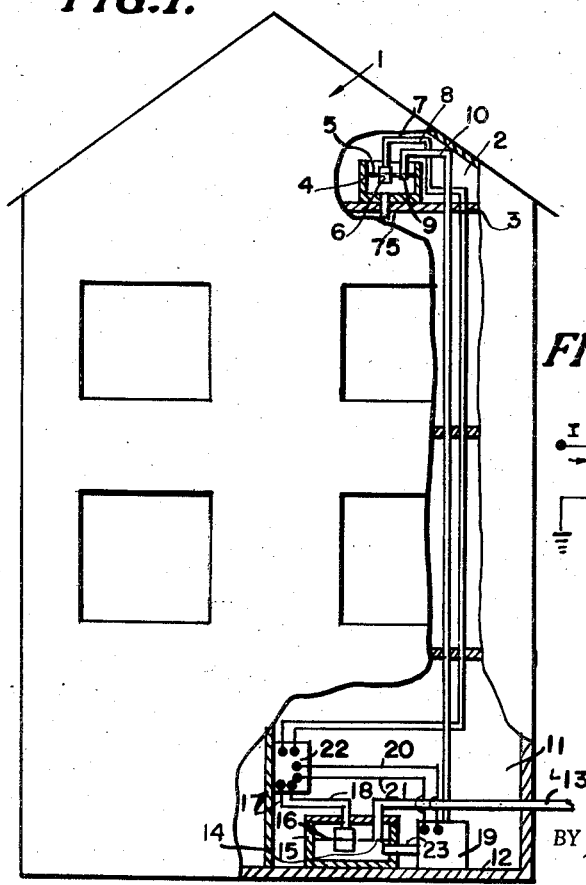
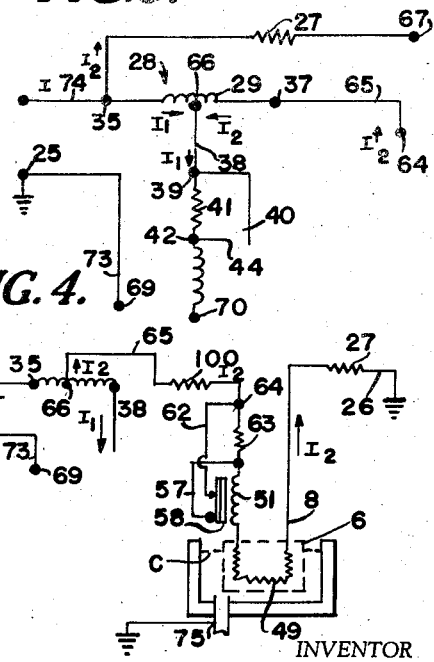
INVENTOR
LEONIDAS GIL DE GIBAJA HERRERO
BY Cushman, Darby & Cushman
ATTORNEYS United States Patent Office 2,884,001
Patented Apr. 28, 1959

2,884,001
LIQUID LEVEL CONTROL SYSTEM

Leonidas Gil de Gibaja Herrero, Havana, Cuba

Application October 31, 1957, Serial No. 693,631

10 Claims. (Cl. 137—392)

This invention relates to liquid level control systems and in particular relates to a liquid level control system for use with a plurality of tanks.

In certain areas throughout the world the terrain is rather flat, and as a result water is not supplied to buildings under a sufficient pressure-head to allow for delivery of the water above the surface level. To build up a sufficient pressure-head for delivering water to different levels of buildings, it is common practice in the flat areas to place a storage tank in an upper level of a building and to pump water thereto from a supply tank placed in a lower level of the building. The tank on the lower level is fed from a public water main with water under low pressure. Water exiting from various valve outlets placed at different levels throughout the building is supplied to the valve outlets by pipework attached to the tank on the upper level, and therefore the water exits under sufficient pressure.

In places where it is necessary or desirable to have a water system of the above type, it is also desirable to provide an automatic control system which assures maintenance of an adequate supply of water in the tank on the upper level at all times. At the same time, it is desirable to provide a control system which incorporates means to prevent unnecessary operation and damage to the pump when there is not a sufficient supply of water in the supply tank.

Accordingly, it is an object of this invention to provide a liquid level control system which incorporates means to maintain the liquid in a storage tank at a minimum level, but which renders the means for delivering liquid to that tank inoperative when there is an inadequate supply of liquid in a supply tank.

It is a further object of this invention to provide a water level control system which has a minimum number of parts, which is easy to install, which is inexpensive to manufacture and which is dependable in operation.

It is a still further object of this invention to provide a water level control system which is not subject to momentary surging or vibratory operation.

It is a particular object of the present invention to provide an electrically-operated water level control system which is responsive to both the level of water contained in a storage tank and the level of water contained in a supply tank from which the storage tank is fed. Such a control system may conveniently include one or more level sensitive elements extending into the liquid of the tanks, which elements vary in an electrical characteristic upon contact with the liquid, and it is an object of this invention to provide a suitable electrical system in combination with such elements.

It is a still further particular object of this invention to provide a control circuit which automatically turns on the supply of water to a storage tank when the water in the tank reaches a predetermined minimum level and which automatically shuts off the supply to that tank when the water reaches a predetermined maximum level, but which automatically renders means for delivering water inoperative should the liquid contained in the supply tank from which the storage tank is fed reach a predetermined minimum level.

Other objects and advantages will become apparent, and the invention will be readily understood when the following description is considered in the light of the annexed drawings in which:

Figure 1 is a schematic partially cut-away side view of a building in which the system of the invention is installed; and Figure 2 is a schematic diagram of the preferred embodiment of the invention including all circuitry in detail.

Figure 3 is a schematic diagram of a modification of this invention which may be incorporated in the complete circuit shown in Figure 2.

Figure 4 is a schematic diagram of another modification of this invention which also may be incorporated in the complete circuit shown in Figure 2.

The system

Referring to Figure 1, a building generally designated by the numeral 1 is shown, having an upper level or attic 2 and a lower level or basement 11. Resting on the floor 3 of upper level 2 is a storage tank 4 which contains water generally designated by the numeral 5.

Disposed within the tank 4 is a level sensitive element 6 which varies in electrical characteristic when contacted by the water 5. Leading from the level sensitive element 6 are two wires 7 and 8 which extend downwardly through the building and connect with a connection box 22. Connection box 22 may be any suitable housing for the various electrical elements hereinafter referred to that are not disposed within a tank. It may be placed on either tank as opposed to the wall as shown. The box is relatively small. In fact, the elements may be housed in any suitable way, and the connection box forms no part of this invention. Extending from the bottom of tank 4 is a pipe 75 which connects with the supply system for delivering water under gravitational pressure to the various outlets disposed throughout the building.

Also disposed within storage tank 4 is the orifice 9 of pipe 10. Pipe 10 extends from the upper level 2 through the building to lower level 11 and connects with pump 19 which is shown as resting on floor 12 of lower level 11.

Extending from pump 19 is a pipe 23 which connects with supply tank or reservoir 15. Traversing one wall of building 1 is a pipe 13 having at one end an orifice 14 which extends into tank 15. The other end of pipe 13 connects with a public water supply main (not shown). Tank 15 may be closed as shown so that when it is full the low pressure water from the public main will no longer flow through orifice 14 of pipe 13, because of the back pressure. The tank 15 may be any supply reservoir and need not be, for purposes of this invention, a container of the form shown.

Disposed within tank 15 is a level sensitive element 16 which varies in electrical characteristic upon contact with water. Extending from level sensitive element 16 are two wires 17 and 18 which run to connection box 22 hereinbefore referred to. Extending from pump 19 are two wires 20 and 21 which also run to connection box 22.

Pump 19 may be any suitable pump of the many well-known types which are electrically operated. It should be understood that this invention is not limited to use with a pumping means. In various applications it may be desirable to control valve means connecting containers. In such case, the pump may be replaced by a valve means which is either directly or indirectly electrically operable. Since the pump may be replaced by a valve or the like without departing from the scope of the invention, the numeral 19 may be said to designate a flow control means.

The pipes 10, 13 and 23 may be any suitable pipe of the types well known in the construction industry. The leads 7, 8, 17, 18, 20 and 21 may be of any of the types commonly used for electrical connections. The detailed features of the pump, the pipes and the wires form no part of the present invention.

The circuit

Referring to Figure 2, the numeral 25 designates a contact which is one contact of a male plug adapted to cooperate with a female section of an electrical outlet (not shown) of the type commonly employed in buildings for connection with the supply lines. Extending from contact 25 is a connector 72 which connects with electrical ground designated by the numeral 71. Although the system will function without the ground connection, such connection is desirable as it eliminates the possibility of receiving a "shock" upon contacting any part of the system. Also, extending from contact 25 is a connector 73 which connects at point 68 with lead 21 from the motor (not shown) of pump 19. The connector 73 also connects, as at point 69, with a lead 17 which extends from one side of level sensitive element 16.

As shown, level sensitive element 16 comprises a resistance 48; however, the level sensitive elements 6 and 16 will be given more detailed discussion hereinbelow. Extending from the other side of level sensitive element 16 is a lead 18 which connects as at point 70 with a heating coil 43 of a continuous current response device generally designated by numeral 47, which will be referred to in detail hereinafter.

When a current runs through heating coil 43, the coil supplies heat to a bi-metallic strip 46 which is fixedly secured at one end as at 53 and which carries a contact 59 at the opposite end. The bi-metallic strip 46 is made of electrically conducting materials having different temperature coefficients of expansion. Connected to bi-metallic strip 46 as at point 55 is a connector 44 which connects with heating coil 43 as at point 42. Also connected to heating coil 43 at point 42 is one end of a resistance 41.

Disposed opposite contact 59 of bi-metallic strip 46 is a cooperating contact 45 which is connected through connector 40 to resistance 41 as at point 39. Resistance 41 and connector 40 are connected as at point 39 to a connector 38 which connects as at point 37 to a coil 29. The other end of coil 29 connects as at point 35 with a connector 74 which extends to contact 24 which is the other side of the female plug (not shown) hereinbefore referred to with regard to contact 25. The coil 29 is the coil of a switching means generally designated by numeral 28. The switching means 28 (as shown) has a contact arm 34 pivoted at 31. Connected to arm 34 as at point 32 is lead 20 from the motor of pump 19. Disposed opposite contact arm 34 is cooperating contact 33 which connects through connector 36 to point 35, connector 74 and contact 24 to one side of the power line. The motor (not shown) of pump 19 is connected across the power line when arm 34 is in contact with contact 33, through contact 25, connector 73, lead 21, lead 20, arm 34, contact 33, connector 36, connector 74 and contact 24.

Connected with connector 74 at point 35 is connector 26 which extends from one side of resistance 27. Extending from the other side of resistance 27 is a connector 75 which connects as at point 67 with lead 8 extending from level sensitive element 6. Level sensitive element 6, as shown, comprises a resistance 49; however, as hereinbefore stated, the level sensitive elements will be discussed in greater detail hereinafter. Extending from the other side of level sensitive element 6 is lead 7 which connects as at point 50 with one side of heating coil 51 of continuous current responsive device 76 which coil heats bi-metallic strip 58 in the same manner that coil 43 heats bi-metallic strip 46. Bi-metallic strip 58 is electrically conducting and carries a contact 60 at one end and is fixedly secured at the other end as at 54. Connected to bi-metallic strip 58 as at point 56 is a connector 57 which connects at point 52 with heating coil 51. Also connecting with heating coil 51 at point 52 is one side of resistance 63.

A cooperating contact 61 is disposed opposite to contact 60. Connector 62 extends from contact 61 to point 64 where it connects with resistance 63. When contact 60 carried by bi-metallic strip 58 engages contact 61, there is an effective short circuit in parallel to resistance 63, the short circuit comprising connector 62, contacts 61 and 60, bi-metallic strip 58 and connector 57.

Extending from point 64 is a connector 65 which connects at point 66 to coil 29 which has a tap provided at point 66 for such connection.

The level sensitive elements

The level sensitive elements 6 and 16 as shown consist of resistances 48 and 49. These resistances may be made of any suitable resistance material, but preferably are made of a material, such as, for example, carbon, which does not react chemically with water.

When water covers any part of the resistance, it acts to short-circuit that part, since water which comes from a public main carries a sufficient number of impurities to cause it to act as a low resistance conductor. Although the level sensitive elements are shown to be resistances, they may be any element which changes in an electrical characteristic upon being subjected to water. For instance, two separated electrodes may be used, as they vary in an electrical characteristic, in that the resistance between them is very high unless a conducting material connects them.

The level sensitive elements may be, as will appear to one skilled in the art, any element which has a negative resistance characteristic upon contact with a liquid.

Continuous current responsive device

The continuous current responsive devices 47 and 76, as shown, comprise a bi-metallic strip which is fixedly secured at one end and which is heated by a coil. There may be provided instead of a bi-metallic strip and a cooperating contact two strips which, when subjected to heat, bend toward each other. The continuous current responsive device need not be of the form shown, but may be any device which does not react to sudden sporadic currents. That is, the continuous current responsive devices need only be some device which requires more than an instantaneous current flow for operation. The temperature sensitive element, the bi-metallic strip, is one piece of apparatus which operates to satisfactorily meet the requirements.

The advantage of incorporating a continuous current responsive device is found in the fact that it prevents surging or vibratory operation of the system as will become readily apparent in connection with the description of the operation of the system.

The switching means generally designated by numeral 28 comprises a current sensitive relay having a coil 29 which is center-tapped as at 66. It should be understood, however, that the switching means need not be a relay as shown, but may be any electromatic switching device which responds only to currents above a minimum value, or to currents below a minimum value. The relay as shown is preferred, but, for example, an electronic tube on which the grid bias is varied may be used without traversing the scope of the invention.

Operation

In order to enable one to readily comprehend the operation of the system, the current travelling through the circuit will be described separately with reference to each of the following water level conditions:

Condition A: water level in supply tank 15 is at or below level A;

Condition B: Water level in supply tank 15 is above level A, and water level in tank 4 is at or below level B; and Condition C: water level in tank 15 is above level A and water level in tank 4 is at level C.

(A) When the water levels in the tanks are as described in condition A, a current I (Figure 2) flows through connector 74 to point 35 wherein it divides into two currents represented by $I_1$ and $I_2$. The current $I_1$ flows through coil 29, connector 38, resistance 41, coil 43, resistance 48 and connector 17. This path comprises one circuit.

Current $I_2$ flows from point 35 through connector 26, resistance 27, connector 75, lead 8, resistance 49 or some part thereof, coil 51, resistance 63, connector 65, the part of coil 29 between points 66 and 37, connector 38, resistance 41, coil 43, resistance 48, lead 17, and connector 73. This path comprises another circuit.

The combination of current $I_1$ through all of coil 29 and $I_2$ through part of coil 29 under condition A is not sufficient to cause a magnetic attraction by coil 29 of arm 34 such that arm 34 engages contact 33. Thus, the motor of pump 19 will not operate because of the gap in the pump circuit between arm 34 and contact 33. The currents $I_1$ and $I_2$ are particularly limited by resistances 41, 48 and 63. The current $I_2$ is not sufficient under condition A to allow for enough heating by coil 51 of bi-metallic strip 58 to cause the strip to carry contact 60 into engagement with contact 61, and thus resistance 63 remains effective in the circuit.

The part of the circuitry connected between point 66 and contact 25 which comprises part of coil 29, connector 38, resistance 41, connector 40, contact 45, coil 43, bi-metallic strip 46, connector 44, lead 18, resistance 48, lead 17 and connector 73 will hereinafter be referred to as the "common branch," since both components $I_1$ and $I_2$ of the current I pass through this branch.

The currents $I_1$ and $I_2$ which pass through the common branch and then coil 43 are not sufficient to allow for enough heating by coil 43 of bi-metallic strip 46 to cause the strip to carry contact 59 into engagement with contact 45, and thus resistance 41 remains effective in the circuit.

Under condition A the resistance 49 may be wholly in, or wholly out of the circuit depending on the water level within tank 4.

As will be apparent, the current $I_1$ which flows under condition A is greater than the current $I_2$, since the current $I_2$ traverses all of the resistance path traversed by current $I_1$ except for that offered by the part of coil 29 between points 35 and 66. The resistance offered by that part of the coil is small compared to the combined resistance of resistances 27 and 63 and the resistance of coil 51.

Summarizing the position of the various contact members under condition A: arm 34 is not engaging contact 33 and therefore pump 19 is deactivated, contact 59 carried by bi-metallic strip 46 is not engaging contact 45 and therefore resistance 41 is effective in the circuit, contact 60 carried by bi-metallic strip 58 is not engaging contact 61 and therefore resistance 63 is effective in the circuit. Water is not shorting out resistance 48 and therefore that resistance is effective in the circuit.

It is thus apparent that the primary function of the combination of level sensitive element 16 and continuous current responsive device 47 is to prevent activation of the flow governing means 28 and 19.

(B) When the water levels in the tanks are as described in condition B, a current I flows through a lead 74 to point 35 where it divides into two currents: $I_1$ and $I_2$, as is the case under condition A.

At first, the current $I_1$ flows through coil 29, connector 38, resistance 41, coil 43, lead 18, the water in tank 15, and any unsubmerged parts of resistance 48, lead 17, and connector 73. This path comprises one circuit. Since resistance 48 is partially or wholly ineffective due to the conduction by the water in tank 15, there is less resistance in the path of current component $I_1$ and thus component $I_1$ is increased over its value in condition A. The component $I_2$ of the current through the common branch above defined, is at most slightly larger in value than it was for condition A because the only change in its resistance path is the decreased or eliminated value of resistance 48. The value of resistance 48 is relatively small compared to the total resistance in the path traveled by current $I_2$.

The currents $I_1$ and $I_2$ through all and part respectively of coil 29 are not sufficient to cause energization of relay 28 such that arm 34 engages contact 33, and therefore the pump 19 is not activated. However, the components $I_1$ and $I_2$ of current I are sufficient to allow for enough heating of bi-metallic strip 46 to cause it to bend, after a time elapse, such that contact 59 engages contact 45. When such engagement occurs, resistance 41 is shorted and thereby rendered ineffective in the circuit, and the current I, consisting of components $I_1$ and $I_2$ increases causing current sensitive switch 28 to become energized such that arm 34 engages contact 33. The pump 19 is then activated since it is connected to both sides of the power line (not shown) through contact 24, connector 74, connector 36, contact 33, arm 34, lead 20, lead 21, connector 73 and contact 25.

The current component $I_2$ during this time is flowing through the same path as it did for condition A except at least some of resistance 49 is ineffective in the circuit because of shorting by the water in tank 4 and resistance 41 is ineffective because it is shorted by engagement of contact 59 with contact 45. The ineffectiveness of resistance 41 is not sufficient to increase current component $I_2$ to a value which causes sufficient heating of bi-metallic strip 58 by coil 51 for engagement of contact 60 with contact 61. For this reason, the level sensitive element 6, or resistance 49, in combination with the continuous current device 76, allow for actuation of the pump 19 by switching means 29. Whenever condition B is met, contacts 60 and 61 of the continuous current responsive device 76 are open and resistance 49 or level sensitive element 6 controls the current such that the contacts remain open and the pump is activated. Therefore, the combination of level sensitive element 6 and continuous current responsive device 76 is a means to cause activation of the flow governing means when the level of liquid in the storage tank 4 is below the level B as shown in Figure 2.

Summarizing the position of the various contact members under condition B: When the system is initially in condition B, the various contacts are in the same positions they occupied under condition A; however, after the system has been in condition B for a predetermined amount of time, contact 59 carried by bi-metallic strip 46 is engaging contact 45 and resistance 41 is short-circuited, arm 34 of current sensitive switch 28 is engaging arm 33 and pump 19 is therefore activated causing delivery of water from supply tank 15 to storage tank 4, contact 60 carried by bi-metallic strip 58 is not engaging contact 61 and therefore resistance 63 is effective in the circuit.

Under condition B the current component $I_1$ is much larger than current component $I_2$ because the resistance path of component $I_1$ has been greatly decreased whereas the same relative decrease has not occurred in the resistance path of component $I_2$.

From the above discussion of the circuit under condition B, it should be apparent that one of the primary functions of the combination of level sensitive element 6 and continuous current responsive device 76 is to cause activation of the flow governing means 28 and 19.

(C) During condition B water is being pumped into storage tank 4 and as a result the water level in tank 4 during condition B rises. When the system reaches the state of condition C, the resistance 49 has become ineffective due to conduction by the water in tank 4. Because of this, the resistance path of current component $I_2$ has decreased. This decrease results in an increased current component $I_2$. Due to the increased value of current component $I_2$ flowing through coil 51, bi-metallic strip 58 is sufficiently heated under condition C to cause it to bend such that contact 60 engages contact 61, and as a result resistance 63 is rendered ineffective in the circuit.

Due to the decrease in the resistance of the path traversed by current component $I_2$ between points 35 and 66 the current component $I_2$ increases. At the same time the current component $I_1$ decreases. The decrease in current component $I_1$ is sufficient to release arm 34 of relay 28 from engagement with contact 33 and the pump 19 is therefore deactivated due to the gap in the pump circuit. The increase in current component $I_2$, and the resulting net increase in net current through coil 29 between points 66 and 37 is not sufficient to prevent deenergization of the relay. Under condition C, the resistance path traversed by current component $I_2$ is a low resistance path in parallel with the part of coil 29 between points 35 and 66, and thus that part of the coil is partially shorted out. This partial shorting accounts for the relative changes in magnitude of current components $I_1$ and $I_2$.

Summarizing the position of the various contact members when the system is in condition C: contact 59 is engaging contact 45 and therefore resistance 41 is ineffective in the circuit, arm 34 of relay 28 is not engaging contact 33 and therefore the pump 19 is deactivated, and contact 60 carried by bi-metallic strip 58 is engaging contact 61 thereby rendering resistance 63 ineffective in the circuit.

It should be apparent now that another primary function of the combination of level sensitive element 6 and continuous current responsive device 76 is to cause deactivation of flow governing means 28 and 19.

By choosing the impedance values of the various components in any manner well known to those of ordinary skill in the art, the relative magnitudes of the currents may be controlled. Of course, the selection of values will depend on the characteristics of the particular installation in question, and in certain instances it may be found desirable to alter the circuit shown in Figure 2.

Figures 3 and 4 present schematic diagrams of modifications of this invention which function in a similar manner to the system shown in Figure 2, but which have slightly different connections.

Modifications

In Figure 3 is shown a modification of this invention wherein the series circuits associated with tanks 4 and 15 are coupled to coil 29 in such a way that current components $I_1$ and $I_2$ counteract one another. Lead 38 is connected to point 66 and lead 65 is connected to point 37. The current I flowing into the circuit through lead 74 divides at point 35, component $I_1$ flowing through part of coil 29, lead 38 and the series circuit associated with tank 15 to ground, and component $I_2$ flowing from point 35 through resistance 27, the series circuit associated with tank 4 and lead 65 back to point 37. Of course, current component $I_1$ is responsible for the heating of bi-metallic strip 46 by coil 43 and component $I_2$ is responsible for the heating of a bi-metallic strip 58 by coil 51. Current component $I_1$, after shorting of resistance 41, is of sufficient magnitude to cause energization of coil 29 and as a result contact 59 to engage contact 45 and therefore energization of pump 19. After the liquid in tank 4 has reached level C, current component $I_2$ is sufficient in magnitude to cause contact 60 to engage contact 61 and thereby short out resistance 63. After such shorting component $I_2$ counteracts component $I_1$ and coil 29 is effectively deenergized. As is readily apparent, the circuit embodied in this modification functions similarly to the circuit shown in Figure 2.

In Figure 4 is shown another modification of this invention which one may desire to use when pipe 75 extending from the bottom of tank 4 or a pipe connected thereto is grounded. In this modication lead 26 is connected to ground instead of point 35 and a resistance designated by the numeral 100 is inserted in lead 65. In this modification current component $I_2$ does not return to join current component $I_1$ such that both components pass through part of coil 29, lead 38 and the rest of the series circuit associated with tank 15. The operation of the circuit in this modification is essentially the same as that described with reference to the circuit shown in Figure 2, however, in this modification when the level of the liquid in tank 4 has reached the level C and current component $I_2$ increases and $I_1$ decreases, then there is no longer sufficient energization of coil 29 to cause energization of pump 19. It will be appreciated that in this modification control of switching means 28 is achieved through the two parts of coil 29 as was the case in the circuit shown in Figure 2.

Conclusion

As will be appreciated, this invention provides a system which is not subject to surging or vibratory operation, because a mere splash of water on either of the current sensitive elements 6 or 16, will not be effective, as continuous current responsive devices 47 and 76 are provided.

The invention also provides a system which fully and effectively accomplishes all of the objects above set forth. The level sensitive element 16, continuous current responsive device 47 and impedance 41 as shown comprise a means to prevent energization of switching means 28 unless there is a sufficient supply of water. The level sensitive element 6, continuous current responsive device 76 and resistance 63 form a means for causing energization and deenergization of the switching means 28.

As will be appreciated, the systems may be modified in various ways without traversing the scope of the invention. For example, it is not necessary that coil 29 be center-tapped. The system would function if connector 65 were connected to coil 29 at point 37, for under condition C, the current path between points 35 and 37 traversed by current component $I_2$ would, in that instance, partially short all of coil 29. Moreover, the resistances 41 and 63 may be replaced by any other type of impedance without changing the basic concept of the invention. Various other modifications have been suggested above.

Although the invention has been described in detail, it is to be clearly understood that the same is by way of limitation, and therefore the claims should be considered as illustrative and should not be construed in a limiting sense.

I claim:

1. For use with an electrical pump means adapted to deliver liquid from a supply tank on one level to a storage tank on a higher level, a water level control system for connection with an electrical power supply comprising an electromagnetic switching means operatively connected to said pump means and having a coil means tapped between its ends, a first series circuit including said switching means, a supply tank liquid level sensitive element having a resistance characteristic which varies with liquid level, a first resistance, and a first continuous current responsive device having a temperature sensitive element for rendering said first resistance ineffective under a given condition, said first series circuit serving to prevent energization of said switching means and thereby said pump means when the level of liquid in said supply tank is below a predetermined level, and connected between one end of said coil means and the tap therein, a second series circuit including a storage tank liquid level sensitive element having a resistance characteristic which varies with liquid level, a second resistance, and a second continuous current responsive device having a temperature sensitive element for rendering said second resistance ineffective under a predetermined condition said second series circuit serving to cause energization and deenergization of said switching means and thereby said pump means in accordance with the level of liquid in said storage tank.

2. For use with an electrical pump means adapted to deliver liquid from a supply tank on one level to a storage tank on a higher level, a water level control system for connection with an electrical power supply comprising an electromagnetic switching means operatively connected to said pump means and having a coil means with a tap between its ends, a first series circuit coupled to said coil means between said tap and one end thereof and including a supply tank liquid level sensitive element having a resistance characteristic which varies with liquid level, a first resistance, and a first continuous current responsive device having a temperature sensitive element for rendering said first resistance ineffective under a given condition, said first series circuit serving to prevent energization of said switching means and thereby said pump means when the level of liquid in said supply tank is below a predetermined level, and a second series circuit including said switching means, a storage tank liquid level sensitive element having a resistance characteristic which varies with liquid level, a second resistance, and a second continuous current responsive device having a temperature sensitive element for rendering said second resistance ineffective under a predetermined condition said second series circuit serving to cause energization and deenergization of said switching means and thereby said pump means in accordance with the level of liquid in said storage tank.

3. For use with an electrical pump means adapted to deliver liquid from a supply tank on one level to a storage tank on a higher level, a water level control system for connection with an electrical power supply comprising an electromagnetic switching means operatively connected to said pump means and having a coil means tapped between its ends, a first series circuit including said coil means, a supply tank liquid level sensitive element having a resistance characteristic which varies with liquid level, a first resistance and a first continuous current responsive device having a temperature sensitive element for rendering said first resistance ineffective under a given condition, said first series circuit serving to prevent energization of said switching means and thereby said pump means when the level of liquid in said supply tank is below a predetermined level, and a second series circuit coupled between the tap on said coil means and an electrical ground and including a storage tank liquid level sensitive element having a resistance characteristic which varies with liquid level, a second resistance, and a second continuous current responsive device having a temperature sensitive element for rendering said second resistance ineffective under a predetermined condition said second series circuit serving to cause energization and deenergization of said switching means and thereby said pump means in accordance with the level of liquid in said storage tank.

4. For use with electrically responsive means governing the flow of liquid at any temperature from a supply reservoir to a storage tank, an electrical control system comprising a single electrical switching means separate from said flow governing means and operably connected with said flow governing means, a first series circuit coupled to said switching means and including means for preventing energization of said switching means when the liquid in said supply reservoir is below a given level, and also coupled to said switching means a second and separate series circuit including means for causing energization of said switching means when the liquid in said storage tank is below a predetermined level and for causing deenergization of said switching means when the liquid in said storage tank is above another predetermined level.

5. A control system as defined in claim 4 wherein said switching means is electromagnetic, and wherein said means for preventing energization of the switching means and said means for causing energization and deenergization of said switching means include continuous current responsive devices.

6. A control system as defined in claim 5 wherein said means for preventing energization of said switching means and said means for causing energization and deenergization of said switching means also include level sensitive elements having a resistance characteristic which varies substantially only with the level of liquid in contact therewith.

7. A control system as defined in claim 5 wherein said electromagnetic switching means includes an energizing coil means, and wherein said second series circuit is coupled to said coil means.

8. A control system as defined in claim 5 wherein said continuous current responsive devices incorporate a temperature sensitive element.

9. A control system as defined in claim 8 wherein said temperature sensitive element is a bi-metallic strip.

10. A control system as defined in claim 4 wherein said means for preventing energization of said switching means and said means for causing energization and deenergization of said switching means include level sensitive elements having a resistance characteristic which varies substantially only with the level of liquid in contact therewith.

References Cited in the file of this patent

UNITED STATES PATENTS

| | | |
|---|---|---|
| 1,045,959 | Eaton | Dec. 3, 1912 |
| 1,346,898 | Kingsbury | July 20, 1920 |
| 2,136,776 | Pugatz | Nov 15, 1938 |
| 2,240,607 | Buck | May 6, 1941 |
| 2,667,178 | Fred et al. | Jan. 26, 1954 |
| 2,774,929 | Schaefer | Dec. 18, 1956 |